United States Patent
Baumgartner et al.

(10) Patent No.: US 6,851,761 B2
(45) Date of Patent: Feb. 8, 2005

(54) PARKING BRAKE ARRANGEMENT AND METHOD OF CONTROLLING THE PARKING BRAKE

(75) Inventors: Johann Baumgartner, Moosburg (DE); Wolfgang Pahle, Heilbronn (DE); Dirk Ganzhorn, Munich (DE)

(73) Assignee: Knorr-Bremse System Fuer Nutzfahrzeuge GmbH, Munich (DE)

( * ) Notice: Subject to any disclaimer, the term of this patent is extended or adjusted under 35 U.S.C. 154(b) by 0 days.

(21) Appl. No.: 10/260,536

(22) Filed: Oct. 1, 2002

(65) Prior Publication Data

US 2003/0070888 A1 Apr. 17, 2003

(30) Foreign Application Priority Data

Oct. 1, 2001 (DE) .......................................... 101 48 480

(51) Int. Cl.[7] .......................... B60T 17/16; F16D 55/02
(52) U.S. Cl. ..................... 303/89; 188/106 P; 188/71.7
(58) Field of Search ........................... 303/89; 188/158, 188/162, 106 P, 71.7

(56) References Cited

U.S. PATENT DOCUMENTS

| | | | | |
|---|---|---|---|---|
| 4,582,177 A | * | 4/1986 | Carre et al. ................. | 188/72.8 |
| 4,809,824 A | * | 3/1989 | Fargier et al. ............. | 188/72.8 |
| 5,477,939 A | * | 12/1995 | Childress .................... | 180/287 |
| 5,620,077 A | * | 4/1997 | Richard ..................... | 192/12 D |
| 5,949,168 A | * | 9/1999 | Dieckmann et al. ...... | 310/75 R |
| 6,153,988 A | * | 11/2000 | Reimann et al. ................ | 318/5 |
| 6,164,420 A | | 12/2000 | Fleischer | |
| 6,267,207 B1 | * | 7/2001 | Fleischer et al. ........... | 188/162 |
| 6,394,235 B1 | * | 5/2002 | Poertzgen et al. ......... | 188/72.6 |
| 6,457,783 B1 | * | 10/2002 | Schanzenbach et al. . | 303/115.2 |
| 6,536,561 B1 | * | 3/2003 | Keller ........................ | 188/71.8 |
| 2002/0171285 A1 | * | 11/2002 | Nelander ..................... | 303/89 |

FOREIGN PATENT DOCUMENTS

| | | | |
|---|---|---|---|
| DE | 197 56 519 | 10/1998 | |
| DE | 19815174 A1 | 10/1999 | |
| DE | 19816801 A1 | 11/1999 | |
| DE | 198 35 550 | 2/2000 | |
| DE | 199 06 227 | 8/2000 | |
| EP | 0905659 A1 | 3/1999 | |
| EP | 1 099 873 | 5/2001 | |
| WO | WO 96/12634 | 5/1996 | |
| WO | WO 01/28835 A1 * | 4/2001 | ........... B60T/13/74 |
| WO | WO 03/053759 | 7/2003 | |

* cited by examiner

*Primary Examiner*—Robert A. Siconolfi
(74) *Attorney, Agent, or Firm*—Crowell & Moring LLP

(57) ABSTRACT

A control process can be carried out during parking braking by way of a parking brake arrangement. The brake is applied by way of a service brake cylinder, and a position of a piston rod is fixed by rotation of a self-locking rotating spindle and application of the rotating spindle to the piston rod or an element connected in front of the piston rod. By additionally rotating the rotating spindle during parking braking, compensation can be made for shrinkages, particularly of a brake disk and/or brake linings, which occur during brake cooling.

25 Claims, 5 Drawing Sheets

PARKING BRAKE ARRANGEMENT AND METHOD OF CONTROLLING THE PARKING BRAKE

This application claims the priority of German application 101 48 480.1, filed Oct. 1, 2001, the disclosure of which is expressly incorporated by reference herein.

BACKGROUND AND SUMMARY OF THE INVENTION

The present invention relates to a parking brake arrangement for pneumatically operated drum or disk brakes. The arrangement includes a pneumatically operated service brake cylinder with a piston rod for operating and releasing the drum or disk brake, and a parking brake actuator which adjoins the service brake cylinder, is particularly fitted onto the service brake cylinder, and has a self-locking rotating spindle which is driven by an electric motor and acts upon the piston rod so that the operating plunger can be displaced, locked, or both displaced and locked by rotation of the rotating spindle. The invention also relates to a method of controlling the parking brake arrangement.

The idea of combining a pneumatically operated brake and an electric motor is known per se. Thus, electric motors are, on the one hand, used as drives for brake adjusting systems. On the other hand, it is known to operate a parking brake by way of an electric motor.

Particularly in the case of heavy commercial vehicles, a spring-loaded brake cylinder is normally used as an operating element for implementing the emergency and parking brake functions. This spring-loaded brake cylinder (called FBA cylinder) is placed onto the service brake cylinder (called BBA cylinder) and transmits the operating force of the accumulator spring by way of a pressure element (face of the piston tube) to the diaphragm piston of the service brake cylinder and thus to the respective operating element of the brake.

For operation of the vehicle, the operating element of the brake is relieved from this brake force, since the prestress piston arranged between the accumulator spring and the service brake cylinder is acted upon pressure such that it moves the accumulator spring in the sense of releasing the brake away from the piston of the service brake cylinder. In this case, the accumulator spring is prestressed further and is held in this condition during the drive.

For engaging the parking brake, the prestress piston is relieved from pressure by bleeding the pertaining working space, and the force of the accumulator spring is thereby utilized in the described manner for operating the brake. By means of a suitable control, this bleeding operation can also take place in a gradual manner, whereby the spring-loaded brake, in addition to having a parking brake function, can also be used as an emergency brake.

Spring-loaded brake cylinders of this type have been successful as parking brake arrangements. However, the relatively large space requirement is less advantageous. The relatively high weight also presents a problem. Furthermore, the relatively high costs of the spring-loaded cylinder, particularly as a result of the required pressure supply and the pneumatic control, are disadvantageous.

This therefore led to the idea of implementing the emergency brake function in the case of electronically controlled braking systems by way of an independent brake control circuit. In this manner, it becomes possible to implement the parking brake function at lower expenditures, that is, without the use of a spring accumulator.

Thus, it is, on the one hand, possible to provide a mechanical locking of the vehicle wheel or of the drive shaft when the vehicle is stopped (see German Patent Documents DE 198 15 174 C2 and DE 198 16 801 A1).

On the other hand, locking of the operating element of the brake in the braked condition is also possible (see European Patent Document EP 0 905 659 A1).

Furthermore, it is possible to lock the brake cylinder in the braked condition. Such a variant is used, for example, in the U.S.A.

With respect to the mechanical locking of the vehicle wheel or the drive shaft while the vehicle is stopped, the problem arises that, when the vehicle is parked on a sloped road, the resulting slope drift force will affect the locking and, because of the occurring friction, a high release force will be required. Furthermore, the form-fitting locking operation cannot take place gradually so that, when the parking brake is engaged, the locked position is reached only when the wheel and thus the vehicle is moved.

Locking the operating element of the brake in the braked condition and locking the brake cylinder in the braked condition have the disadvantage that the brake is not adjusted in the braked condition. However, an adjustment also in the braked condition is advantageous in the case of disk brakes for compensating a shrinkage phenomenon on the brake disk and the brake shoes which occurs during cooling of a brake parked when the brake is hot.

A special advantage of a spring-loaded parking brake is that the accumulator spring compensates for the above-described shrinkage phenomenon without a significant power drop by further adjusting the operating element of the brake. In this manner, the application force of the brake is maintained even during the described shrinkage events on cooling brake components.

It is therefore an object of the invention to provide a parking brake arrangement and a method of controlling the parking brake arrangement by which, even without the use of a spring-loaded brake cylinder, compensation for the shrinkage process of the brake disk and the brake shoes is possible during cooling of the brake system after engagement of the parking brake.

The invention achieves this object both by way of a parking brake arrangement according to the present invention and by way of a method of controlling the parking brake arrangement according to the present invention.

According to the invention, the rotating spindle has a self-locking thread, so that the position of the piston rod can be locked by the rotating spindle. Additionally or alternatively, a control device is assigned to the electric motor, which control device is designed to carry out a compensation for shrinkages occurring because of the cooling of the brake, particularly of the brake disk and/or the brake linings, by additionally rotating the rotating spindle during parking braking.

In addition, the invention provides a controlling process for a parking brake arrangement of this type. In this process, the following control steps take place during parking braking:

a) The brake is applied by the service brake cylinder;

b) the position of the piston rod is fixed by rotation of the self-locking rotating spindle and application of the rotating spindle to the piston rod or an element connected in front of the piston rod; and c) by additionally rotating the rotating spindle during parking braking, a compensation is carried out for shrinkages, particularly of the brake disk and/or of the brake linings, which occur because of cooling of the brake.

During braking, the service brake cylinder is engaged first, for example, by way of an emergency brake circuit. Subsequently, a prerotation of the rotating spindle takes place by way of the geared electric motor until the rotating spindle comes to rest on the piston rod or on an element connected in front of the piston rod, such as a disk or a diaphragm with a disk. Since the spindle has a self-locking thread, the operating element of the brake is now locked in the braked condition.

Then, by way of additional rotation of the rotating spindle, a compensation for shrinkage processes takes place. Various methods can be used for this purpose.

Thus, the required additional rotation of the rotating spindle for adjusting the parking brake arrangement can take place during parking braking as a function of measuring the braking force in the braked condition after the application of the brake by way of the service brake cylinder.

As an alternative, it is possible to have the additional rotation of the spindle for adjusting the parking brake arrangement take place by a periodic adjustment for a given time period.

As an alternative, or optionally, it is also possible to have the additional rotation of the rotating spindle for adjusting the parking brake arrangement take place at a lower rotational speed than application of the rotational spindle during the parking braking.

The operating force can be measured, for example, by way of a sensor; for example, measurement can be made by way of measurement of component tensions by strain gauges. In the event of a reduction of the component tensions and thus of the operating force of the brake, for example, because of shrinkage processes of cooling-down brake components, the electric motor will be acted upon by current by way of the electronic monitoring and control system until the original operating force is restored.

It is particularly advantageous to be able to generate the required high adjusting force during adjustment of the brake by way of a small-dimensioned electric motor. For this purpose, the design is such that the rotational speed of the spindle system can be operated with at least two different speed stages—fast speed and slow speed. By way of the slow speed—called creep speed—, the advantage can be utilized that the shrinkage processes, as a result of cooling down, take place relatively slowly, so that a large transmission ratio can be used. Nevertheless, locking of the service brake cylinder is to take place relatively fast when the service brake is engaged, for which the fast speed is used. Overcoming the relatively large operating path during application of the brake by a compressed-air operation can take place without a higher operating force at the spindle, so that the electric motor has to apply no brake operating force.

Fast speed and slow speed adjustability can, for example, be implemented by having a two-speed transmission connected between the electric motor and the rotating spindle. This transmission is preferably designed with two speeds and in a self-switching manner by way of a friction clutch and a one-way clutch.

As an alternative, the electric motor may be an inverse-speed motor or may be designed such that it can be operated as an inverse-speed motor.

In addition to the above-mentioned mechanical variants, it is conceivable to design the control system for controlling at least two different rotational motor speeds.

Implementing the fast speed/slow speed function in a mechanical or electrical mode or by way of a combination of the mechanical and electrical modes has various advantages.

Thus, in the mechanical solution, a transmission can be used which is self-switching by way of at least two transmission positions. In this case, for overcoming the lift without a counterforce, a drive of the spindle takes place by way of a clutch while reversing the last transmission position. When the threaded spindle is placed against the service brake cylinder piston, the clutch slips or opens up, and a one-way clutch engages for driving the spindle with the least transmission position and thereby transmits a high output torque to the threaded spindle. Such a mechanical solution is distinguished by a particularly high operational reliability.

As an alternative and in a particularly cost-effective manner, an influence on the rotational speed—torque characteristic with the driving motor can also be implemented by way of a suitable control. In this case, a rotational speed—torque characteristic of a direct-current inverse-speed motor combines a very high motor starting torque with a very high idling rotational speed. On the one hand, a true inverse-speed motor is suitable for this purpose. As an alternative, an electronically controlled electric motor with such a characteristic can also be controlled in the high-load and low-load ranges. This can take place, for example, by way of a control with an impressed current or by way of a winding switch-over.

Advantageous further developments of the invention are reflected in the dependent claims.

Preferred embodiments will be described in detail by way of reference to the drawing figures.

DETAILED DESCRIPTION OF THE INVENTION

Figure 1:
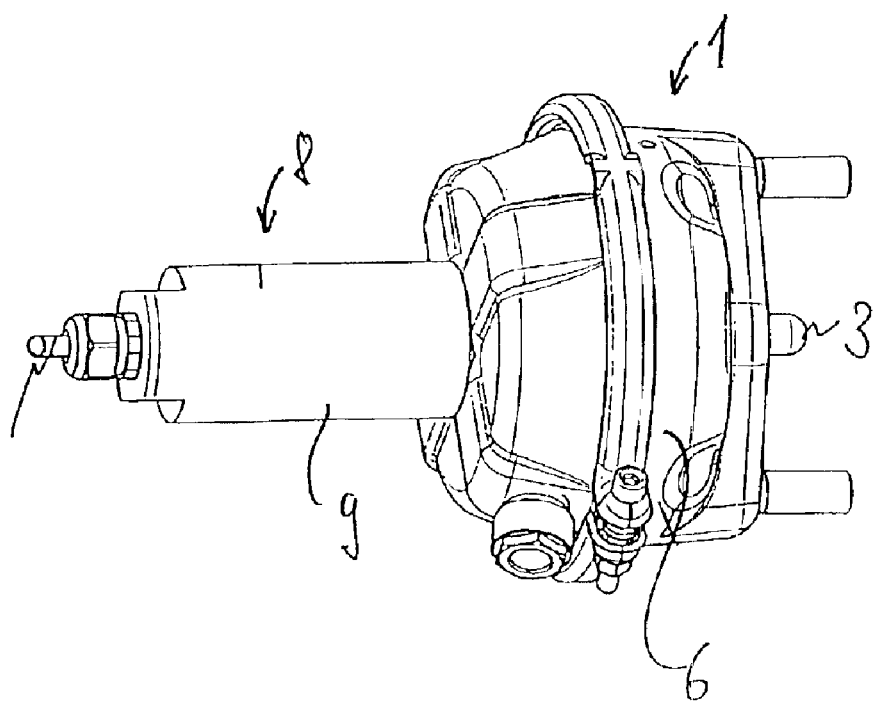
FIG. 1 is a perspective view of a parking brake arrangement according to the invention.

FIG. 1 illustrates a parking brake arrangement for pneumatically operated drum or disk brakes having a pneumatically operated service brake cylinder 1 which is designed as a diaphragm cylinder.

Figure 2:
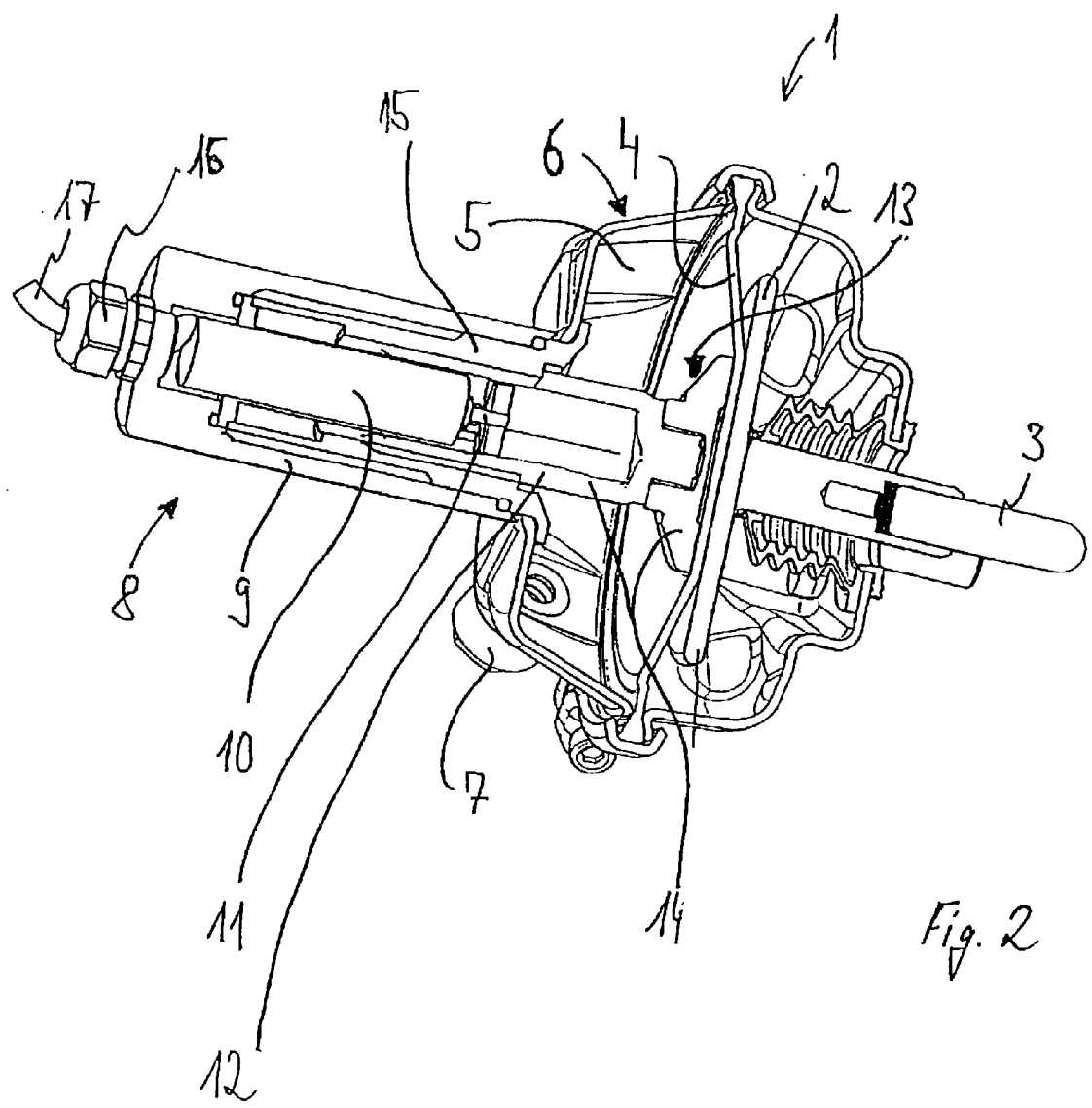
FIG. 2 is a sectional view of the parking brake arrangement of FIG. 1 in the tensioned or braked condition.

According to FIG. 2, the diaphragm cylinder has a disk 2 to which a piston rod 3 is fastened directly or by way of intermediate elements, such as a pressure piece. A diaphragm 4 acts upon the disk 2, which diaphragm 4 closes off a ventilation space 5. When the ventilation space 5 is ventilated, the diaphragm 4 presses the disk 2 with the piston rod 3 linearly to the front so that the drum brake or disk brake to be connected with the diaphragm cylinder is applied (position of FIG. 2). A housing 6, which is multi-part in this case and has a compressed-air connection 7 leading into the ventilation space 5, closes off the diaphragm cylinder to the outside.

According to FIG. 1, a parking brake actuator 8 is attached to the end of the diaphragm cylinder facing away from the piston rod 3. The parking brake actuator 8 has a housing 9 in which an electric motor 10—here, a combined geared motor—is arranged. As an alternative, a separate transmission (not shown here) can also be connected behind the electric motor. The driven gear 11 of the geared motor 10 acts upon a rotating spindle 12 in which it is arranged in an axially displaceable manner but non-rotatably with respect to this rotating spindle 12. At its end facing away from the electric motor 10, the rotating spindle 12 has a type of pressure piece 13 which can be caused to rest against the diaphragm 4 of the service brake cylinder.

A sleeve-type attachment 14 of the rotating spindle, which is provided with a self-locking external thread, is screwed into a complementary sleeve 15 which is arranged in the housing 9 and has an internal thread.

At a cable bushing 16, which penetrates the housing 9 and has a cable 17, the electric motor 9 can be connected with a control device—such as an EBS control unit.

Figure 3:
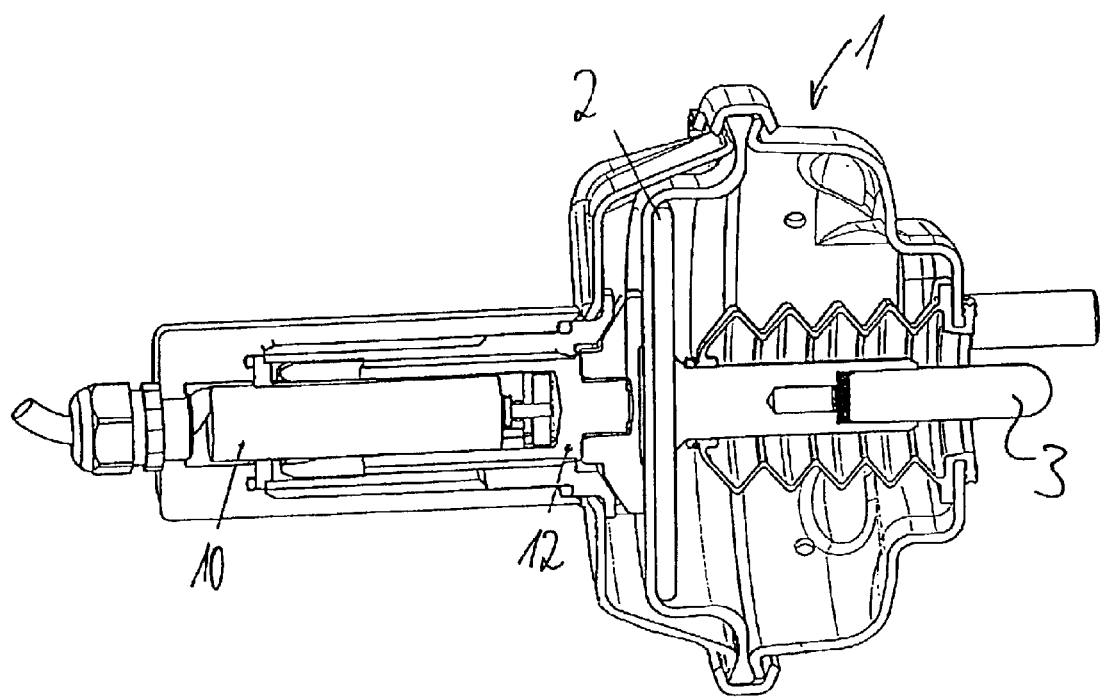
FIG. 3 is a sectional view of the parking brake arrangement of FIG. 1 in the released condition.

When the driven gear 11 is rotated, the pressure piece is therefore linearly displaced. For releasing the brake (FIG. 3), the piston rod is restored by the restoring force of the disk brake per se as well as a supplementary diaphragm restoring spring after the release and the return rotation of the rotating spindle 12.

Figure 4:
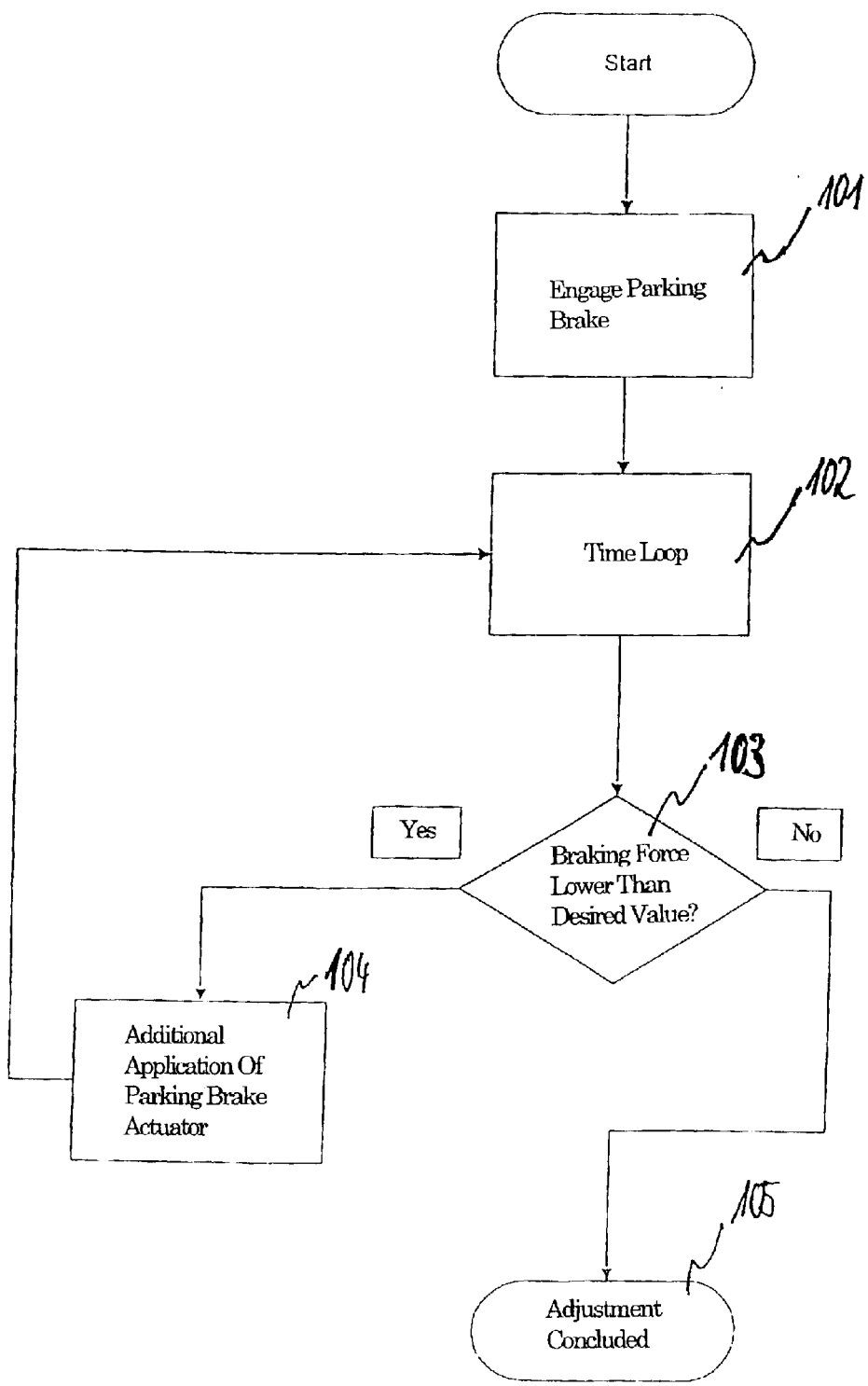
FIGS. 4 and 5 are flow charts illustrating the control method according to the invention.

FIG. 4 shows a first control method. After the start of the parking braking, the parking brake is engaged (control step 101); then a time loop (control step 102) is started in which it is first checked (control step 103) whether the braking force is lower than a desired value. If this is so, another application of the actuator of the parking brake takes place (control step 104). Otherwise, the adjusting operation is concluded (control step 105). If required, this time loop can be started again after a given time period.

Figure 5:
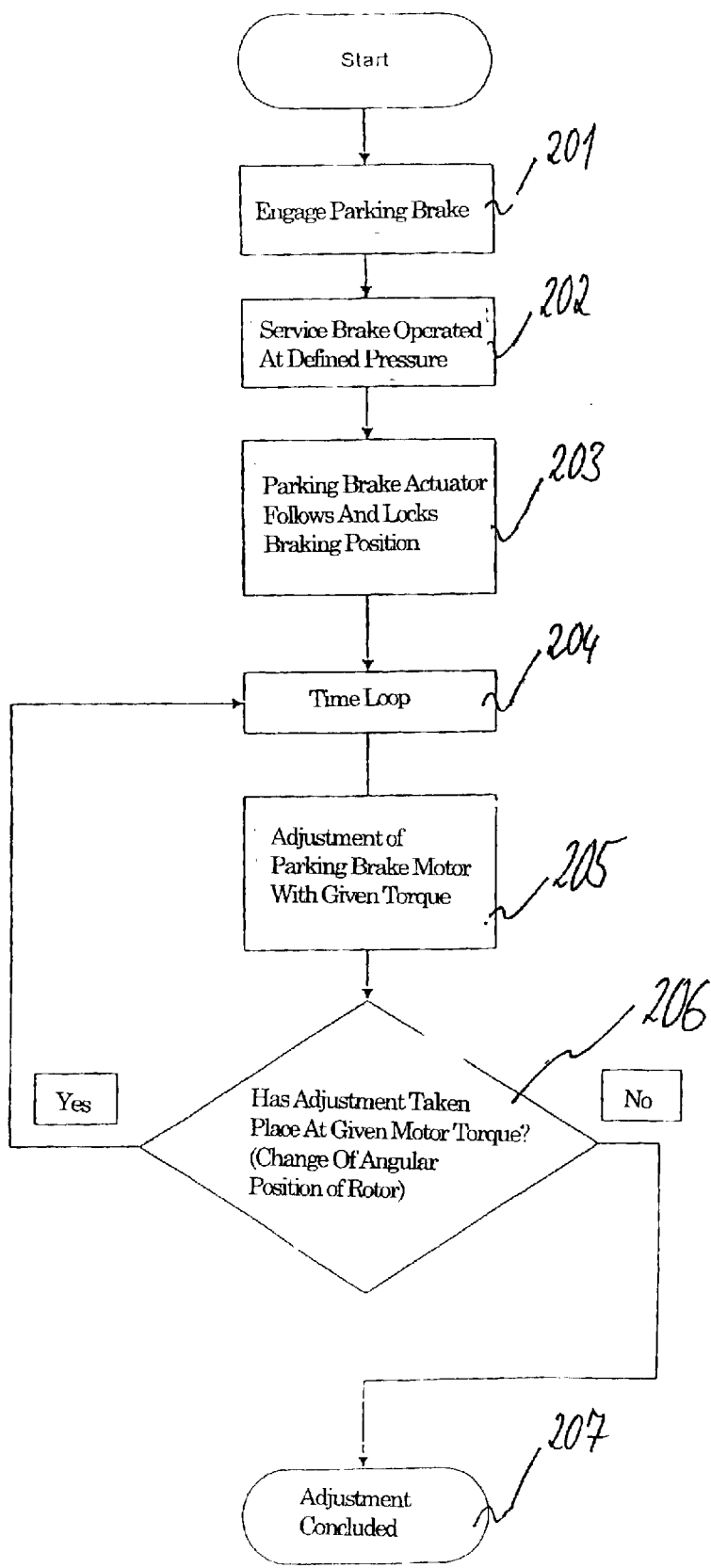

According to FIG. 5, engagement of the parking brake (control step 201) first takes place after a start of the routine, in which case the service brake is operated at a defined pressure (control step 202); then the actuator of the parking brake follows and locks the braking position (control step 203). Similar to the method of FIG. 4, a time loop is then started for adjusting (control step 204) which initiates an adjustment of the motor of the parking brake with a given torque (control step 205). Then, a change of the angular position of the rotor is determined (control step 206) in order to decide whether an adjustment has taken place at the given torque. If this is so, the time loop is started again in control step 204. If this is not so, the adjusting operation is concluded and the routine is stopped (control step 207).

If the service brake fails, the diaphragm cylinder cannot be operated. In this case, the resistance of the spindle causes the overload clutch to slip. As a result of the invention, it is now possible to drive the spindle drive by way of a transmission at a low rotational speed and a high torque, which has the result that the vehicle can be securely parked also when the service brake has failed.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

We claim:

1. A parking brake arrangement for pneumatically operated drum or disk brakes, comprising:
    a pneumatically operated service brake cylinder with a piston rod for operating and releasing the drum or disk brake,
    a parking brake actuator which adjoins and is fitted onto the service brake cylinder, and has a self-locking rotating spindle which is driven by an electric motor and acts upon the piston rod so that the operating plunger can be displaced, locked, or both displaced and locked by rotation of the rotating spindle,
    wherein the rotating spindle has a self-locking thread so that the position of the piston rod can be locked by the rotating spindle; and
    a control device assigned to the electric motor, the control device operating the electric motor during a particular parking brake actuation to compensate for shrinkages occurring because of cooling-down of the brake during the particular parking brake actuation by performing additional rotation of the rotating spindle.

2. The parking brake arrangement according to claim 1, wherein the shrinkages compensated for are at least one of shrinkages of the brake disk and/or of the brake linings.

3. The parking brake arrangement according to claim 1, wherein a rotating speed of the rotating spindle can be adjusted between at least two mutually different fast and slow speed stages.

4. The parking brake arrangement according to claim 1, wherein a two-speed transmission is switched between the electric motor and the rotating spindle.

5. The parking brake arrangement according to claim 4, wherein the two-speed transmission is designed in a self-switching manner with two speeds by way of a friction clutch and a one-way clutch.

6. The parking brake arrangement according to claim 1, wherein the electric motor is an inverse-speed motor.

7. The parking brake arrangement according to claim 1, wherein the electric motor is designed such that it can be operated as an inverse-speed motor.

8. The parking brake arrangement according to claim 1, wherein a device for a winding switch-over is assigned to the electric motor.

9. The parking brake arrangement according to claim 1, wherein the service brake cylinder is a diaphragm cylinder.

10. The parking brake arrangement according to claim 2, wherein a rotating speed of the rotating spindle can be adjusted between at least two mutually different fast and slow speed stages.

11. The parking brake arrangement according to claim 2, wherein a two-speed transmission is switched between the electric motor and the rotating spindle.

12. The parking brake arrangement according to claim 11, wherein the two-speed transmission is designed in a self-switching manner with two speeds by way of a friction clutch and a one-way clutch.

13. The parking brake arrangement according to claim 2, wherein the electric motor is an inverse-speed motor.

14. The parking brake arrangement according to claim 2, wherein the electric motor is designed such that it can be operated as an inverse-speed motor.

15. The parking brake arrangement according to claim 2, wherein a device for a winding switch-over is assigned to the electric motor.

16. The parking brake arrangement according to claim 2, wherein the service brake cylinder is a diaphragm cylinder.

17. A method for controlling a parking brake arrangement having a pneumatically operated service brake cylinder with a piston rod for operating and releasing a drum or disk brake, a parking brake actuator adjoining and fitting onto the service brake cylinder, the parking brake actuator having a self-locking rotating spindle driven by an electric motor so as to act upon the piston rod to displace, lock, or both displace and lock the operating plunger by rotation of the rotating spindle, and a control device for controlling the electric motor during parking braking, the method comprising the acts of:
    applying the brake by way of the service brake cylinder,
    fixing a position of the piston rod by rotation of the self-locking rotating spindle and application of the rotating spindle to the piston rod or an element connected in front of the piston rod, and additionally rotating the rotating spindle during a particular parking braking to compensate for shrinkages, which occur because of a cooling-down of the brake during the particular parking braking.

18. The method according to claim 17, wherein additional rotation of the rotating spindle required for adjusting the parking brake arrangement takes place during parking braking as a function of measuring the braking force in the braked condition after application of the brake by way of the service brake cylinder.

19. The method according to claim 17, wherein additional rotation of the rotating spindle for adjusting the parking brake arrangement during parking braking takes place by periodic adjustment for a given time period.

20. The method according to claim 17, and further comprising determining a rotating angle while additionally rotating the rotating spindle to adjust the parking brake arrangement.

21. The method according to claim 17, wherein additional rotation of the rotating spindle for adjusting the parking brake arrangement takes place at a lower rotational speed of the rotating spindle than during application of the rotating spindle during parking braking.

22. The method according to claim 18, wherein additional rotation of the rotating spindle for adjusting the parking brake arrangement during parking braking takes place by periodic adjustment for a given time period.

23. The method according to claim 18, and further comprising determining a rotating angle while additionally rotating the rotating spindle to adjust the parking brake arrangement.

24. The method according to claim 18, wherein additional rotation of the rotating spindle for adjusting the parking brake arrangement takes place at a lower rotational speed of the rotating spindle than during application of the rotating spindle during parking braking.

25. The method according to claim 17, wherein the shrinkages compensated for are those of at least one of a brake disk and brake linings.

* * * * *